(12) United States Patent
Schenk

(10) Patent No.: US 9,036,159 B2
(45) Date of Patent: May 19, 2015

(54) DEVICE FOR GENERATING AN OPTICAL DOT PATTERN

(71) Applicant: Sypro Optics GmbH, Jena (DE)

(72) Inventor: Ingo Schenk, Plauen, DE (US)

(73) Assignee: Sypro Optics GmbH, Jena (DE)

( * ) Notice: Subject to any disclaimer, the term of this patent is extended or adjusted under 35 U.S.C. 154(b) by 0 days.

(21) Appl. No.: 14/155,666

(22) Filed: Jan. 15, 2014

(65) Prior Publication Data

US 2014/0198319 A1    Jul. 17, 2014

(30) Foreign Application Priority Data

Jan. 17, 2013    (DE) .......................... 10 2013 200 657

(51) Int. Cl.
| | |
|---|---|
| *G01B 11/30* | (2006.01) |
| *G02B 26/00* | (2006.01) |
| *G02F 2/00* | (2006.01) |
| *G01B 11/25* | (2006.01) |
| *G03B 21/00* | (2006.01) |

(52) U.S. Cl.
CPC ............ *G01B 11/25* (2013.01); *G01B 11/2513* (2013.01); *G03B 21/00* (2013.01)

(58) Field of Classification Search
None
See application file for complete search history.

(56) References Cited

U.S. PATENT DOCUMENTS

| | | | | |
|---|---|---|---|---|
| 5,808,784 | A * | 9/1998 | Ando et al. ................... | 359/443 |
| 8,274,646 | B2 * | 9/2012 | Ota et al. ......................... | 356/73 |
| 2004/0046966 | A1 * | 3/2004 | Fujita ............................. | 356/604 |
| 2010/0177164 | A1 * | 7/2010 | Zalevsky et al. ................ | 348/46 |
| 2010/0311005 | A1 * | 12/2010 | Liang ............................... | 433/29 |
| 2012/0120412 | A1 * | 5/2012 | Bellis et al. .................... | 356/603 |
| 2013/0002859 | A1 * | 1/2013 | Yamaguchi et al. .......... | 348/135 |
| 2013/0335531 | A1 * | 12/2013 | Lee et al. ........................ | 348/46 |
| 2014/0226863 | A1 * | 8/2014 | Bernstein et al. ............. | 382/106 |

FOREIGN PATENT DOCUMENTS

| | | | | |
|---|---|---|---|---|
| DE | 19608632 | * | 3/1996 | ............. G01B 11/25 |
| DE | 196 08 632 | | 9/1997 | |
| WO | WO-97/33140 | | 9/1997 | |
| WO | WO-99/15930 | | 4/1999 | |

OTHER PUBLICATIONS

Fresnel formulas from Wikipedia with English translation (printed Jan. 14, 2014) 18 pages.

* cited by examiner

*Primary Examiner* — Kara E Geisel
*Assistant Examiner* — Jarreas C Underwood
(74) *Attorney, Agent, or Firm* — Volpe and Koenig, P.C.

(57) ABSTRACT

A device for capturing a three-dimensional object is presented, which allows, on one hand, a sufficiently large number of projected pixels and a high image quality of the projected pixels, and which has, on the other hand, a compact size and low assembly costs.

10 Claims, 2 Drawing Sheets

DEVICE FOR GENERATING AN OPTICAL DOT PATTERN

CROSS-REFERENCE TO RELATED PATENT APPLICATIONS

This application claims priority to German application 10 2013 200 657.8, filed Jan. 17, 2013, the entire disclosures of which are hereby incorporated by reference in their entirety and for all purposes as if fully set forth herein.

FIELD

The present invention relates to a device for generating an optical dot pattern, and more particularly, the present invention relates to a device for detecting a three-dimensional object.

BACKGROUND

Devices for capturing three-dimensional objects, in particular 3-D laser scanners, can be used for the detection of body contours.

Such laser scanners are used, for example, for three-dimensional contour detection for games consoles. Players can hereby operate the software of console games with their own body movements. For this purpose, a depth sensor is used in addition to a 3D microphone, a camera and the software.

The depth sensor is composed of a separate transmitter unit and a separate receiver unit. The transmitter unit consists of a projector generating a dot pattern. In this case, the dot pattern is projected onto a person located in front of the projector using a laser diode and a diffractive optical element (DOE). This dot pattern is read by the receiving unit—a camera—and converted by a processor into spatial information (3D-information). The number of generated dots plays an important role in the degree of detail and the quality of the spatial information.

To meet the demands for a more precise spatial image capture, the number of projected dots can be increased. However, a higher image quality of the dot pattern is required for this purpose than can be achieved with conventional diffraction gratings.

One possibility for generating dot patterns with a high image quality is the use of so-called "Micro Electro Mechanical Systems" (MEMS). These MEMS have a mirror that oscillates very fast about two axes and continuously deflects a laser beam, thereby generating a dot pattern depending on the position of the mirror.

To capture a detailed three-dimensional object with high precision, the dot pattern requires, on the one hand, a sufficiently large number of projected pixels and, on the other hand, a high image quality of the projected pixels.

Although the image quality and number of pixels can be increased by using MEMS, such devices, however, require relatively complex spatial arrangements, resulting in a large number of components. The resulting small tolerances make mass production expensive and thus unprofitable. Additional adjustment steps (active and passive) to compensate for tolerances add complexity.

A conventional device for capturing a three-dimensional object using a rotatable mirror (MEMS) is shown schematically in FIGS. 1 and 2.

The device includes a diode laser 110 and a collimator lens 111. The light emitted by the diode laser 110 which is then collimated is incident on a polarizing beam splitter 112. The radiation 113 reflected by the polarizing beam splitter 112 is incident on a deflection mirror 115 where it is redirected to the MEMS 114. The MEMS 114 oscillates continuously about two axes over a predetermined angular range, thus generating with the deflections (at a predefined distance) a (divergent) dot pattern on an object. Since the interior of the components of the optical system must be free from dirt particles, for example, because MEMS joints can attract dust due to static electricity and thus become inoperative, all illustrated components are sealed to the outside by a housing (not shown here). The sequentially generated divergent dot pattern 117 is coupled through an optically transparent protective glass 116.

After the dot pattern 117 is emitted, it is (partially) reflected on an object and the radiation 119 reflected on the object passes again through the protective glass 116 and enters the device (FIG. 2). The reflected light 119 propagates through the MEMS 114, the deflecting mirror 115, then passes through the polarizing beam splitter 112 and is focused by the focusing lens 126 on the detector 124. The signal received by the detector 124 may subsequently be converted into spatial information about the (partially) reflecting object.

Disadvantageously, assembly is very expensive due to the large number of required components. The spatial arrangement of these components also requires larger components due to their structure. However, these prevent a desired small size of the device.

DISCLOSURE

It is therefore an object of the present disclosure to provide a device for generating an optical dot pattern (optionally by using a pivotable mirror) that allows, on one hand, a sufficiently large number of projected pixels and a high image quality of the projected pixels and which has, on the other hand, a small size and facilitates installation. In addition, the device of the invention should be economically manufacturable. In addition, the device of the invention should also have a small number of components.

These objects are attained by the features of claim 1. Advantageous embodiments of the invention are recited in the dependent claims.

The idea of the present invention is to simultaneously use the protective glass as a means for coupling the dot pattern out from the device, as a means for coupling the dot pattern into the device, as well as a mirror for deflecting the coupled-in dot pattern in the direction of the detector.

The central part of the invention is a protective glass disposed in the housing wall, which operates as coupling-in-facet and coupling-out-facet and is configured to allow the radiation to almost completely pass through in the range of an incident angle that is smaller than a first critical angle (for example 0° to 40°), whereas radiation at a incident angle greater than a second critical angle (for example 60°) is almost completely reflected. This can obviate the need for an additional deflection mirror inside the device, because the protective glass now assumes the function of the deflection mirror. The number of components and thus the necessary installation space can then be reduced.

According to one aspect of the present disclosure, the inventive device for generating and capturing an optical dot pattern includes: a housing, an optical protective glass arranged in an opening of the housing, means for generating and coupling an optical dot pattern out, and means for coupling in and detecting an optical dot pattern, wherein the transmission of the protective glass for the radiation of the optical dot pattern, that is incident on the protective glass with respect to the surface normal of the protective glass at an angle having a magnitude that is smaller than a first critical angle, is greater than a first transmission value, and wherein the transmission the protective glass for radiation, that is incident on the protective glass with respect to the surface normal of the protective glass at an angle having a magnitude that is greater than a second critical angle, is smaller than a second transmission value, and wherein the first critical angle is smaller than the second critical angle, wherein the first critical angle is greater than 20°, the second critical angle is smaller than 80°, and the difference between the first transmission value and the second transmission value is greater than 0.3.

According to the present invention, a full circle encompasses 360°. The transmission (also referred to as transmittance) is defined according to the present invention as the ratio between the intensity of the optical radiation after the respective element (the protective glass) and the intensity of the optical radiation before the respective element. Thus, a non-transparent medium thus has a transmittance of zero, whereas a completely transparent medium would have in a transmittance of one.

The protective glass is preferably formed to be highly transparent and should not contain any particles enhancing the absorption of light. Preferably, the absorption of light (for the radiation of the optical dot pattern) under normal incidence on the protective glass is less than 10%, more preferably less than 5% and still more preferably less than 1%.

Preferably, the first critical angle is greater than 25°, more preferably greater than 30°, still more preferably greater than 35° and even more preferably greater than 40°. Preferably, the second critical angle is smaller than 75°, more preferably smaller than 70°, even more preferably smaller than 65° and even more preferably smaller than 60°. Preferably, the difference between the first transmission value and the second transmission value is greater than 0.4, more preferably greater than 0.5, more preferably greater than 0.6, still more preferably greater than 0.7, still more preferably greater than 0.8, and even more preferably greater than 0.9.

Preferably, the protective glass is designed such that the ratio of the first transmission value to the second transmission value greater than 2, preferably greater than 5, more preferably greater than 10 and even more preferably greater than 20.

In other words, the protective glass according to the invention is designed in such a way that the transmission of the protective glass decreases significantly in the angular range between the first critical angle (for example 40°) and the second critical angle (for example) 60°, for example, by at least 0.7 (corresponding to about 70%), making it possible to use the protective glass, on one hand, for coupling in and coupling out with an angle of incidence less than or equal to the first critical angle and, on the other hand, as a means for deflecting the coupled-in dot pattern having an angle of incidence greater than or equal to the second critical angle. The different angles of incidence for coupling the dot pattern in and out, on one hand, and for deflecting the coupled-in dot pattern (onto a detector), on the other hand, can be realized by suitable positioning of the detector, the light source and the pivoting mirror.

A protective glass with the predetermined transmission in the corresponding angular range can be realized, for example, with a single-layer system, preferably however with a multi-layer system. In particular, so-called thin layers can be used to adjust the reflection and transmission characteristic of the protective glass for the respective wavelengths of the dot pattern (or wavelengths of the dot pattern with monochromatic light). Preferably, dielectric materials (high transparency) are used. The respective parameters (layer thickness, refractive index) of the layers can be determined depending on the predetermined transmission and the predetermined angular range, for example, by using the Fresnel equations (for example, Born/Wolf Principles of Optics, Pergamon Press, sixth edition, page 40 et seq., and page 68 et seq.)

According to a preferred embodiment of the present invention, the device includes a light source which is configured to emit a light beam, a (polarizing) beam splitter with a partially reflecting surface, a mirror (preferably a MEMS) configured for pivoting about two axes, wherein the pivotally mounted mirror is arranged inside the housing, and an optical detector, wherein the beam splitter is arranged in relation to the light source and to the pivotable mirror such that at least a portion of the light emitted from the light source is directly incident on the beam splitter and a portion of this radiation is reflected so as to directly impinge on the pivotally mounted mirror. Preferably, the light source is constructed to emit monochromatic light. Preferably, the light source is formed by a laser diode. Preferably, the light source is arranged such that the light emitted from the laser diode propagates parallel to the surface normal of the protective glass. Preferably, a collimator configured to collimate the light emitted from the light source is arranged between the light source and the beam splitter. This can improve the imaging quality of the projected pixels (and therefore the precision with which the three-dimensional object can be captured).

The beam splitter operates, on one hand, to deflect the light beam generated by the light source onto the mirror, from where it then coupled out by the protective glass and (sequentially) projected as a dot pattern onto an object, and on the other hand, to transmit the dot pattern reflected on the object to the detector after coupling in via the protective glass and after deflection by the mirror and the protective glass. The (preferably polarizing) beam splitter thereby causes the optical path of the coupled-out light to be separated from the optical path of the light that was reflected by the object and was subsequently coupled in.

The beam splitter is preferably constructed as a polarizing beam splitter. The suitably pre-polarized light incident from the light source can then be initially reflected at the beam splitter substantially in the direction of the pivotally mounted mirror, whereas the light retroreflected from the object can now pass, after a further reflection at the pivotally mounted mirror, almost completely through the beam splitter towards the detector.

Preferably, the beam splitter is arranged with respect to a surface normal of the protective glass at the second critical angle relative to the protective glass. This ensures in the case of normal incidence, that a collimated laser beam directed onto the beam splitter is reflected in the direction of the pivotable mirror (preferably MEMS).

Preferably, the mirror is positioned and pivotable arranged in relation to the beam splitter and the protective glass such that the light reflected by the beam splitter and incident on the mirror is reflected by the mirror and impinges on the protective glass at an angle in relation to the surface normal of the protective glass that has a magnitude smaller than or equal to the first critical angle.

Preferably, the mirror is positioned and pivotable arranged in relation to the beam splitter and the protective glass such that the radiation passing from outside the housing through the protective glass at an angle in relation to the surface normal of the glass with respect to the surface normal of the protective glass that has a magnitude smaller than or equal to the first critical angle and impinges on the mirror, is reflected by the mirror and impinges on the protective glass at an angle in relation to the surface normal of the protective glass that has a magnitude greater than or equal to the second critical angle, wherein the absolute value of the first critical angle is smaller than the absolute value of the second critical angle.

Preferably, the first critical angle is 40°. Preferably, the second critical angle is 60°. The difference between the second critical angle and the first critical angle is preferably smaller than 50°, more preferably smaller than 40° and still more preferably smaller than 30°. This difference between the critical angles is the range within which the transmission of the protective glass decreases from a high value (first critical angle) to a low value (second critical angle). The steeper the drop is, i.e. the smaller the difference between the critical angles is, the greater is the potential operating range of the mirror for coupling the dot pattern out.

The partially reflecting surface of the beam splitter is preferably configured planar. Furthermore, the beam splitter is preferable aligned with respect to the light source such that the planar surface of the beam splitter is arranged at the second critical angle relative to an optical axis of the light beam emitted from the light source.

Preferably, all the optical elements used to produce the dot pattern are arranged inside the housing. Therefore, the light source, the beam splitter and the optical detector are preferably also arranged inside the housing. The housing is sealed against the environment so as to prevent dirt particles from entering the interior of the housing. More preferably, the housing is sealed against the environment so as to prevent dirt particles having a particle size greater than 1 mm, more preferably greater than 100 μm, more preferably greater than 1 μm, from entering the interior of the housing. More preferably, the housing is hermetically sealed. The protective glass is disposed in an opening of the housing and sealed by a seal.

Preferably, the mirror is constructed for pivoting about two different axes. Preferably, the device includes means for calculating a three-dimensional object from the detected optical dot pattern.

Preferably, the protective glass on the side facing the MEMS has a coating which implements the defined transmission ratios.

The pivotable mirror is preferably constructed as a Micro-Electro-Mechanical-System (MEMS). The MEMS has a mirror that oscillates rapidly about two axes and continuously deflects the laser beam (from the light source) in a dot pattern; in other words, sequentially generates the dot pattern by way of the deflections. Thus, a bundle of beams with different angles is sequentially generated, generating a preferably regular dot pattern on an object located outside the device. The laser beam is quasi scanned by the MEMS across the dot pattern. Due to a preferably high scanning frequency of the mirror (preferably greater than 20 Hz per pass, more preferably 100 Hz), the laser beam scanned across the object is perceived as a fixed point pattern.

The emitted dot pattern is (partially) reflected on an object and the radiation reflected on the object passes again through the protective glass into the device. The reflected radiation is subsequently passed onward by the MEMS, passes through the beam splitter and is projected onto a detector. The dot pattern received by the detector can subsequently be converted into spatial information of the (partially) reflecting object. For this purpose, the device includes means for determining the three-dimensional object from the received dot pattern.

BRIEF DESCRIPTION OF THE DRAWINGS

The invention will now be described with reference to exemplary embodiments. The drawings show in.

DETAILED DESCRIPTION OF THE DRAWINGS

Figure 1:
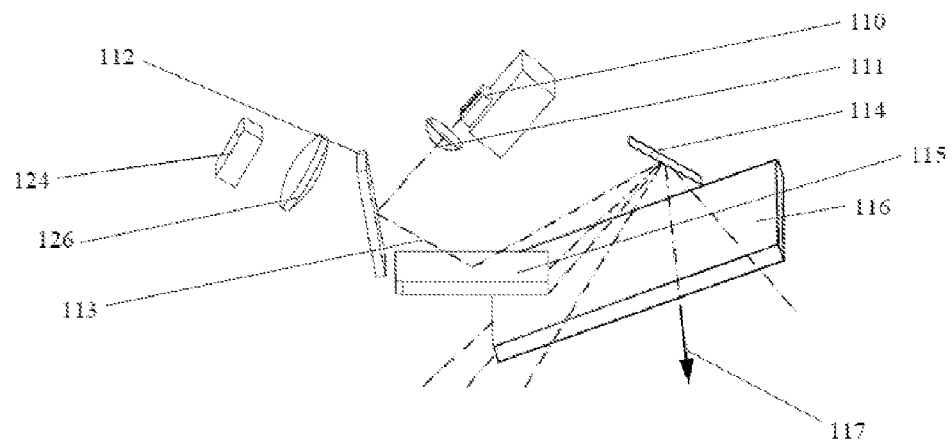
FIG. 1 a schematic perspective diagram of a conventional device for capturing a three-dimensional object when coupling a dot pattern out, FIG. 2 a schematic perspective diagram of a conventional device for capturing a three-dimensional object when coupling a dot pattern in, FIG. 3 a schematic perspective diagram of a preferred embodiment of a device according to the present invention for capturing a three-dimensional object (when coupling a dot pattern out), and FIG. 4 a schematic perspective diagram of a preferred embodiment of a device according to the present invention for capturing a three-dimensional object (when coupling a dot pattern in).
Figure 2:
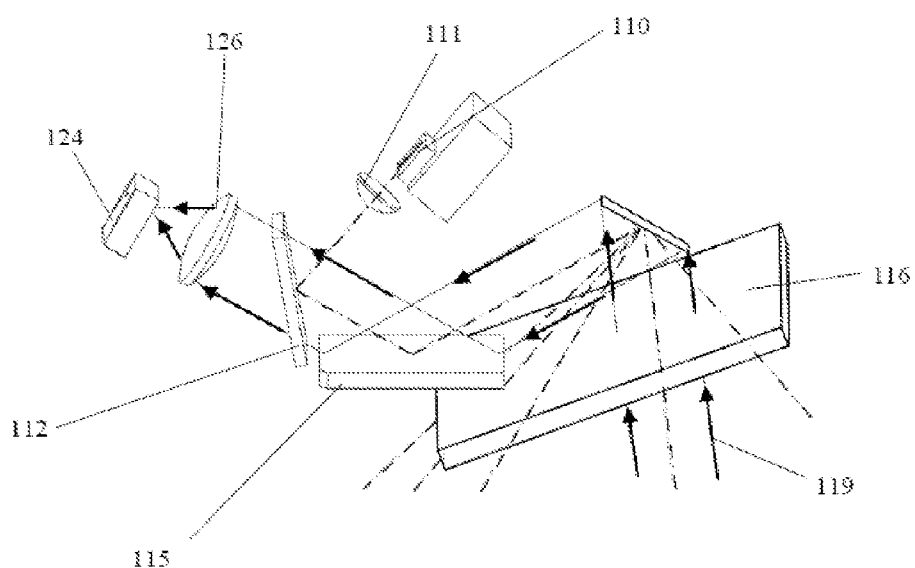
Figure 3:
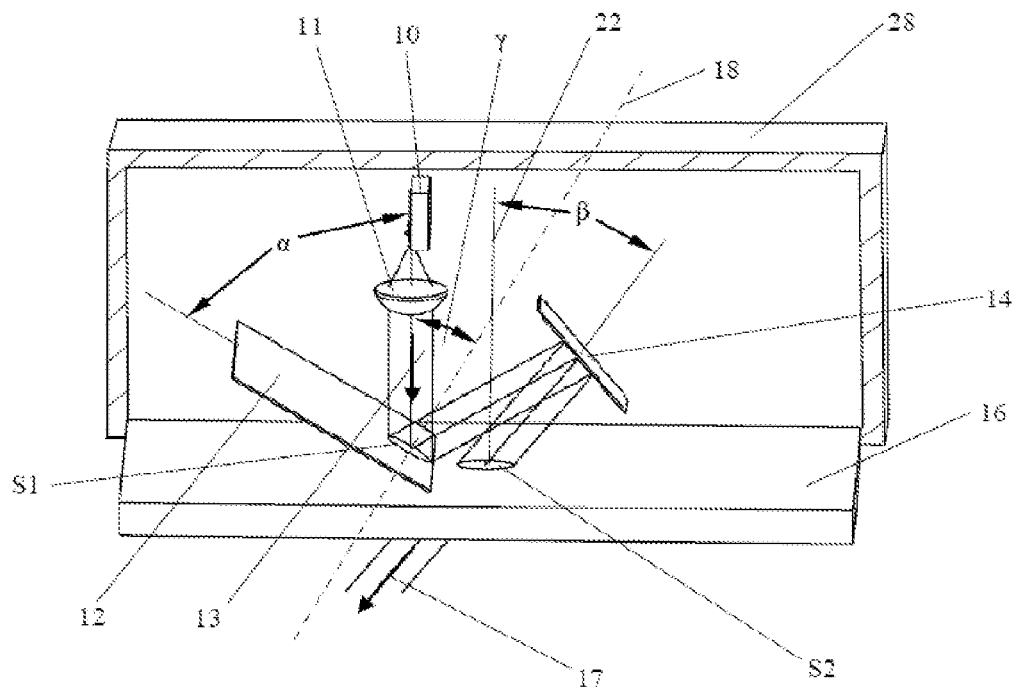
Figure 4:
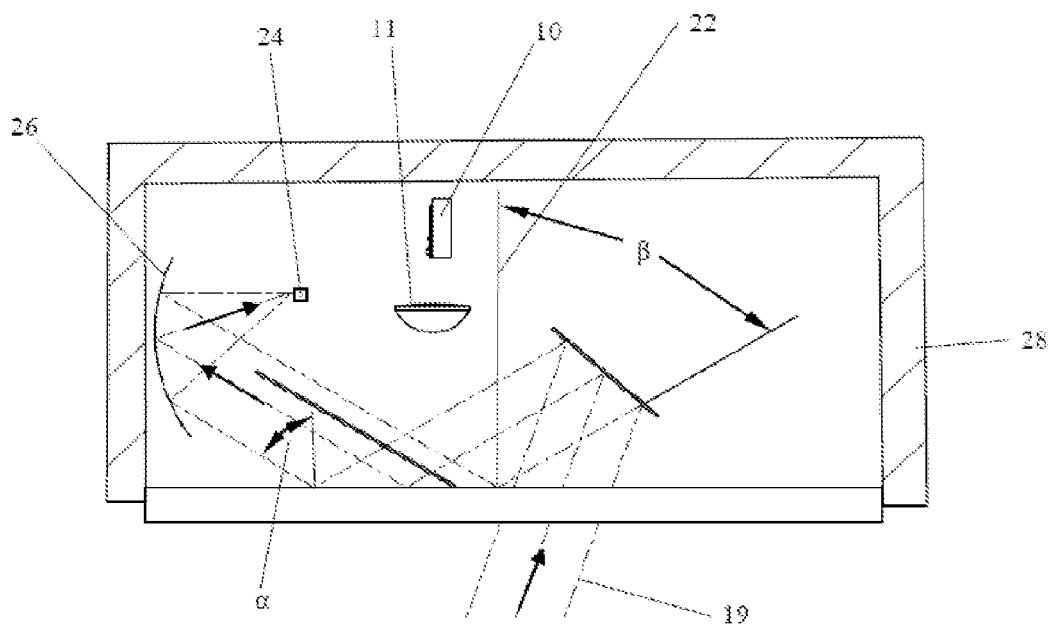

FIGS. 3 and 4 show a device according to the invention for capturing a three-dimensional object according to a preferred embodiment.

The device includes a diode laser 10 and a collimator lens 11. The light 13 emitted by the diode laser 10 which is subsequently collimated is incident on the polarizing beam splitter 12. The radiation reflected by the polarizing beam splitter 12 impinges, without the action of additional optical elements, directly on the pivoting mirror 14 formed as a MEMS. The MEMS 14 oscillates continuously about two axes over a predetermined angular range such that the light incident from the beam splitter 12 is coupled out at an angle between −40° and 40° (angle β) relative to the surface normal 22 of the protective glass 16 and a dot pattern is generated outside the device at a predefined distance.

Since the components of the optical system, particularly the MEMS 14, must be free from dirt particles, the elements 10, 11, 12 and 14 are sealed to the outside by a housing 28. The dot pattern 17 generated sequentially by the oscillations of the mirror 14 is coupled out by the protective glass 16 (FIG. 3) at an angle β that is smaller than or equal to the first critical angle.

The emitted dot pattern 17 is partially reflected on an (unillustrated) object and the radiation 19 reflected on the object passes through the protective glass 16 and again enters the housing (FIG. 4). The reflected light 19 is subsequently retroreflected by the MEMS 14 in the direction of the polarizing beam splitter 12. The polarizing beam splitter 12 now transmits (at least a portion) of the radiation, which then reaches the detector 24 by way of the concave focusing mirror 26. The beam splitter 12 thus separates the light path originating from the light source 10 that couples the dot pattern out from the optical path that couples the dot pattern in. In the preferred embodiment, the beam splitter 12 is arranged at an angle α with respect to the axis 22, wherein the angle α (in this case 60°) corresponds to the second critical angle.

According to the invention, the MEMS 14, the beam splitter 12, the light source 10 and the protective glass 16 are positioned relative to each other so that the dot pattern 17 is coupled out by the protective glass 16 at an angle β which is smaller than or equal to the first critical angle (here 40°), whereas the radiation 19 (reflected at the object) is incident on the protective glass 16, after being coupled in through the protective glass 16 (also at the angle β between −40° and +40°) and after reflection on the MEMS 14, at an angle α in relation to the surface normal 22 of the protective glass 16 that corresponds to the second critical angle (here 60°).

Since the protective glass 16 that is coated on the inside is configured according to the preferred embodiment such that the transmittance is almost 1 (i.e. 100%) at the first critical angle β, whereas the transmission is almost 0 (i.e. 0%) at the second critical angle α, the radiation coupled-in and reflected by the MEMS 14 toward the beam splitter 12 and the protective glass 16 is now almost completely reflected by the protective glass 16, and can thus advantageously be deflected by the protective glass 16 toward the focusing mirror 26, and thereafter toward the detector 24. The focusing mirror 26 focuses the light to the position of the detector 24. A particularly compact design can thus be achieved with the small number of optical components.

The dot pattern received by the detector 24 (signal) can subsequently be converted into spatial information of the (partially) reflecting object.

Advantageously, minimizing the distance between spot S1 and spot S2 indicated in FIG. 3 has proven effective for attaining a particular compact construction (i.e. a small transceiver unit), wherein S1 is the region of the beam splitter 12, on which the light from the laser diode 10 is incident, and S2 is the region of the protective glass 16, via which the spot pattern 17 is coupled out. Preferably, that the minimum distance between S1 and S2 is less than 500%, more preferably less than 400%, more preferably less than 300%, more preferably less than 200% and even more preferably less than 100% of the diameter of the spot S1. The diameter of the spot S1 is determined over the radially symmetric area within which 90% of the energy of the light source 10 is incident on the beam splitter 12.

With this system, the thickness of the beam splitter 12 can advantageously be minimized, ultimately by using so-called coated pellicle foils having a thickness of only a few micrometers. Preferably, the thickness of the beam splitter 12 is smaller than 500 μm, more preferably smaller than 200 μm, more preferably smaller than 50 μm, still more preferably smaller than 30 μm and even more preferably smaller than 15 μm.

Advantageously, the position of the detector 24 can be moved out of the zone of the beams incident on the focusing mirror 26.

According to the invention, the device has few components and can be relatively easily assembled, thus producing a compact unit with a small footprint.

The device of FIGS. 3 and 4 is in the specific embodiment specified as follows.

| | |
|---|---|
| Laser wavelength | 905 nm |
| Focal length of the collimating lens | 3.3 mm |
| Thickness of the collimator lens | 1.268 mm |
| Distance to the laser collimator | 2.497 mm |
| Distance from the collimator to the center of the spot 1 | 6.1 mm |
| first critical angle β | 40° |
| second critical angle α | 60° |
| Distance between pivot point of the MEMS and protective glass | 4.96 mm |
| Distance between pivot point of the MEMS to the center of the spot 1 | 8.6 mm |
| Distance between pivot point of the MEMS and protective glass along the major beam | 9.939 mm |
| Surface area of the MEMS | 6 mm × 2 mm |
| Distance between the protective glass and the mirror along an axis parallel to the surface normal of the protective glass | 6.270 mm |
| Distance between the protective glass and the mirror along the major beam | 12.869 mm |
| Focal length of the mirror | 4.980 mm |
| Distance between the mirror and the detector spacing along the major beam | 6.486 mm |
| Distance between the detector and the laser along an axis parallel to the protective glass | 5.921 mm |
| Distance between laser and the pivot point of the MEMS along an axis parallel to the protective glass | 7.458 mm. |

The major beam is indicated in FIG. 4 by arrows.

In the present embodiment, the protective glass consists of a layer stack having 52 individual dielectric layers.

| Layer # | Material | Thickness (nm) |
|---|---|---|
| 1 | Nb2O5 | 158.25 |
| 2 | SiO2 | 221.85 |
| | RAS | |
| 3 | Nb2O5 | 127.89 |
| 4 | SiO2 | 197.37 |
| | RAS | |
| 5 | Nb2O5 | 138.33 |
| 6 | SiO2 | 200 |
| | RAS | |
| 7 | Nb2O5 | 115.96 |
| 8 | SiO2 | 203.03 |
| | RAS | |
| 9 | Nb2O5 | 124.91 |
| 10 | SiO2 | 206.05 |
| | RAS | |
| 11 | Nb2O5 | 123.58 |
| 12 | SiO2 | 207.84 |
| | RAS | |
| 13 | Nb2O5 | 112.05 |
| 14 | SiO2 | 208.9 |
| | RAS | |
| 15 | Nb2O5 | 119.47 |
| 16 | SiO2 | 208.99 |
| | RAS | |
| 17 | Nb2O5 | 120.91 |
| 18 | SiO2 | 207.47 |
| | RAS | |
| 19 | Nb2O5 | 127.45 |
| 20 | SiO2 | 204.67 |
| | RAS | |
| 21 | Nb2O5 | 134.04 |
| 22 | SiO2 | 200.67 |
| | RAS | |
| 23 | Nb2O5 | 139.81 |
| 24 | SiO2 | 197.85 |
| | RAS | |
| 25 | Nb2O5 | 157.77 |
| 26 | SiO2 | 198.29 |
| | RAS | |
| 27 | Nb2O5 | 115.65 |
| 28 | SiO2 | 201.06 |
| | RAS | |
| 29 | Nb2O5 | 138.11 |
| 30 | SiO2 | 204.42 |
| | RAS | |
| 31 | Nb2O5 | 136.89 |
| 32 | SiO2 | 205.18 |
| | RAS | |

-continued

| Layer # | Material | Thickness (nm) |
|---|---|---|
| 33 | Nb2O5 | 89.85 |
| 34 | SiO2 RAS | 205.35 |
| 35 | Nb2O5 | 117.97 |
| 36 | SiO2 RAS | 206.18 |
| 37 | Nb2O5 | 147.39 |
| 38 | SiO2 RAS | 205.75 |
| 39 | Nb2O5 | 97.05 |
| 40 | SiO2 RAS | 204.89 |
| 41 | Nb2O5 | 90.93 |
| 42 | SiO2 RAS | 205.47 |
| 43 | Nb2O5 | 151.1 |
| 44 | SiO2 RAS | 205.38 |
| 45 | Nb2O5 | 122.06 |
| 46 | SiO2 RAS | 203.04 |
| 47 | Nb2O5 | 82.55 |
| 48 | SiO2 RAS | 201.45 |
| 49 | Nb2O5 | 162.25 |
| 50 | SiO2 RAS | 199.49 |
| 51 | Nb2O5 | 118.02 |
| 52 | SiO2 RAS | 93.68 |

LIST OF REFERENCE SYMBOLS

10 Light source
11 Collimator
12 Beam splitter
13 Collimated radiation
14 Mirror/MEMS
16 Protective glass
17 Coupled-out dot pattern
18 Surface normal of the beam splitter
19 Coupled-in dot pattern
22 Surface normal of the protective glass
24 Detector
26 Focusing mirror
28 Housing
S1 Spot 1
S2 Spot 2
$\alpha$ Angle of the incident radiation (relative to the surface normal of the protective glass) after reflection at the pivotable mirror
$\beta$ Angle of the exiting radiation (relative to the surface normal of the protective glass) after reflection at the pivotable mirror
$\gamma$ Angle between the radiation from the laser diode and the surface normal of the beam splitter
110 Light source
111 Collimator
112 Beam splitter
113 Collimated radiation reflected on the beam splitter
114 Mirror/MEMS
115 Deflection mirror
116 Protective glass
117 Coupled-out dot pattern
119 Coupled-in dot pattern
124 Detector
126 Focusing lens

What is claimed is:

1. A device for generating an optical dot pattern, comprising:
a housing,
an optical protective glass arranged in an opening of the housing,
means for generating and coupling out an optical dot pattern, and
means for coupling in and detecting an optical dot pattern, wherein the transmission of the protective glass for the radiation of the optical dot pattern, which is incident on the protective glass in relation to the surface normal of the protective glass at an angle having a magnitude smaller than or equal to a first critical angle ($\beta$), is greater than a first transmission value (T1), and wherein the transmission of the protective glass for radiation that is incident on the protective glass in relation to the surface normal of the protective glass at an angle having a magnitude greater than or equal to a second critical angle ($\alpha$), is smaller than a second transmission value (T2), and wherein the first critical angle ($\beta$) is smaller than the second critical angle ($\alpha$),
wherein the first critical angle ($\beta$) is greater than 20°, the second critical angle ($\alpha$) is smaller than 80°, and the difference between the first transmission value (T1) and the second transmission value (T2) is greater than 0.3.

2. The device according to claim 1, wherein
the first critical angle ($\beta$) is greater than 30°, the second critical angle ($\alpha$) is smaller than 70°, and the difference between the first transmission value (T1) and the second transmission value (T2) is greater than 0.7.

3. The device according to claim 1,
further comprising:
a light source, which is configured for emitting a light beam,
a beam splitter having a partially reflecting surface,
a mirror which is pivotally arranged, wherein the pivotally arranged mirror is disposed inside the housing,
an optical detector,
wherein the beam splitter is arranged in relation to the light source and the pivotally arranged mirror such that at least a portion of the radiation emitted from the light source is incident on the beam splitter and a portion of this radiation is reflected so as to impinge on the pivotally arranged mirror.

4. The device according to claim 3,
wherein the mirror is arranged in relation to the beam splitter and the protective glass and is constructed for pivoting such that the radiation reflected by the beam splitter and impinging on the mirror is reflected by the mirror and is incident on the protective glass with respect to the surface normal of the protective glass at an angle having a magnitude that is smaller than or equal to the first critical angle ($\beta$), and
that radiation that passes from outside the housing with respect to the surface normal of the protective glass through the protective glass at an angle having a magnitude smaller than or equal to the first critical angle ($\beta$), and is incident on the mirror, is reflected by the mirror and impinges on the protective glass in relation to the surface normal of the protective glass at an angle having a magnitude that is greater than or equal to the second critical angle ($\alpha$),
wherein the absolute value of the first critical angle ($\beta$) is smaller than the absolute value of the second critical angle ($\alpha$).

5. The device according to claim 1,
wherein the first critical angle (β) is 40° and the second critical angle (α) is 60°.

6. The device according to claim 1,
wherein the partially reflecting surface of the beam splitter is planar.

7. The device according to claim 6,
wherein the beam splitter is oriented with respect to for the light source such that the planar surface of the beam splitter is arranged so as to have the second critical angle (α) with respect to an optical axis of the light beam emitted from the light source.

8. The device according to claim 1,
wherein the light source, the beam splitter and the optical detector are arranged inside the housing.

9. Device according to claim 1,
wherein the mirror is constructed for pivoting about by two different axes.

10. The device according to claim 1,
wherein further comprising means for calculating a three-dimensional object from the detected optical dot pattern.

\* \* \* \* \*